Nov. 16, 1948. F. S. STICKNEY 2,454,230
MOTOR BRUSH HOLDER CONNECTOR
Filed July 1, 1947
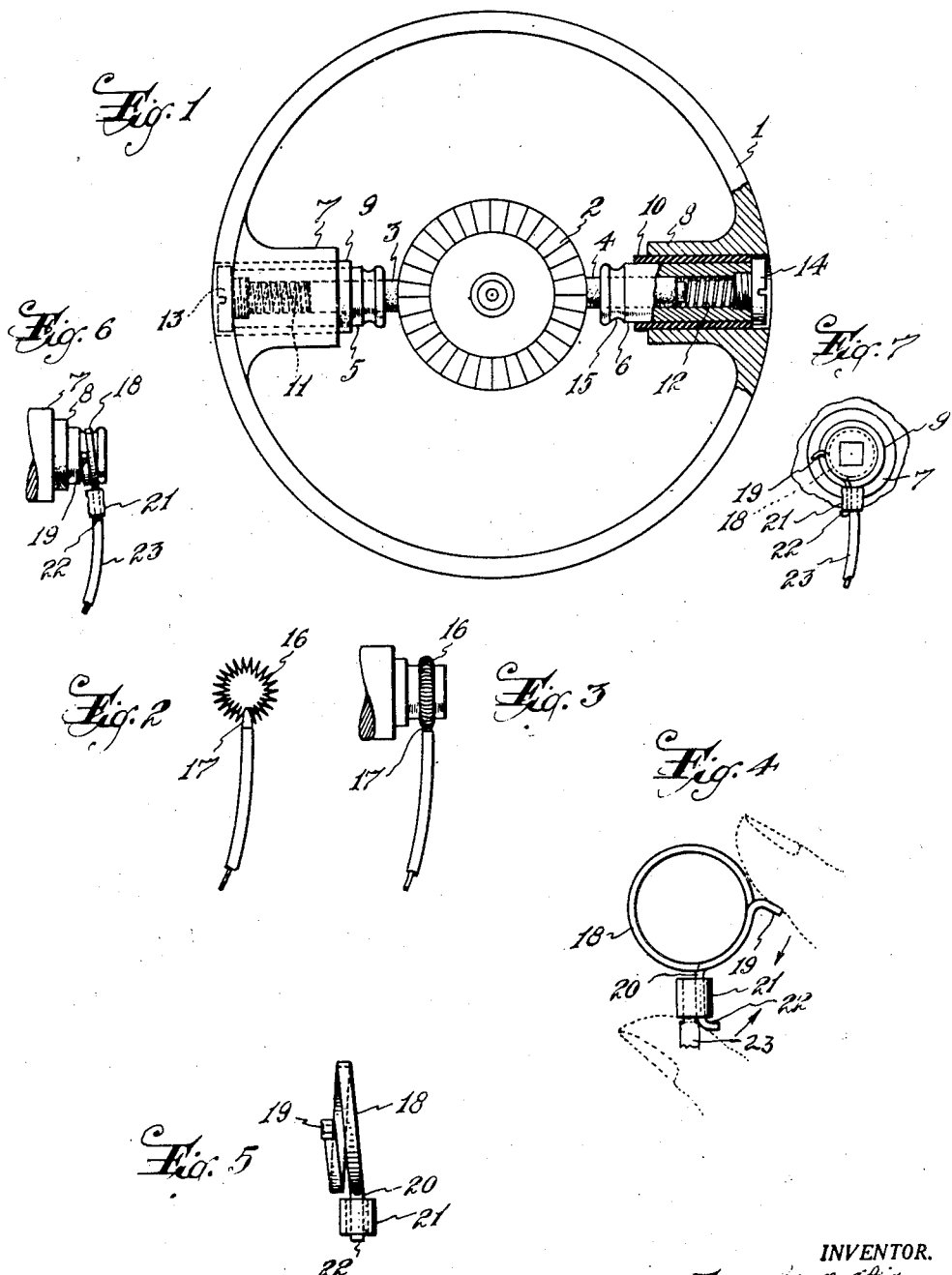
INVENTOR.
Fernald S. Stickney
BY A. D. T. Libby
Attorney Patented Nov. 16, 1948

2,454,230

UNITED STATES PATENT OFFICE 2,454,230

MOTOR BRUSH HOLDER CONNECTOR

Fernald S. Stickney, West Caldwell, N. J.

Application July 1, 1947, Serial No. 758,376

6 Claims. (Cl. 171—323)

This invention relates to a type of connecting means especially adapted for use on small A. C. or D. C., universal type motors. In the past it has been the general practice to make connection with the brush holder of such a motor by providing a groove at the end of the brush holder and then fitting into this groove a closely wound helical spring of fine wire, the ends of which are brought together to form an approximate circle, and these ends being soldered together with a conductor which may come from the stator of the motor. The looping of the wire and the soldering operations are relatively expensive and the fine wire helix will sometimes jump out of the brush holder groove when the motor is subjected to some shock.

Another objectionable feature of the prior art construction is that fine wire is subject to corrosive action and fails rapidly.

In order to overcome these objectionable features I have provided a new and simpler means of making connections to the motor brush holder.

In accomplishing this I have provided a helix made out of flat wire having a cross section sufficient to carry the current to the brush with relatively low loss.

Another advantage is that the hoop like helix provides a tension that is much greater than the prior art device, and the motor will withstand greater shocks without causing the connector to jump out of the groove.

A further advantage is the method of connecting a motor conductor to the helix or loop so that the two will remain in permanent electrical connection without the use of solder.

A further advantage of my construction is that the loop connector may be made by automatic methods requiring a minimum of hand work for assembly with the motor lead and hence reduces the cost.

A further advantage of my new construction is that it can be assembled to the motor brush holder easier and quicker than any of the prior art devices with which I am familiar.

A still further advantage is that the construction is such that the connector will resist corrosion very much longer than prior art devices which have very small cross sectional areas as compared with my new type connector.

These and other advantages will be understood by one familiar with these devices.

Figure 1 is a part sectional and part elevational view of the commutator end of a motor.

Figure 2 is a plan view of a prior art construction of the connector for making an electrical contact with the brush holder.

Figure 3 is a side view of the device shown in Figure 2 as applied to a brush holder.

Figure 4 shows schematically the manner of operating my new device for application to a brush holder.

Figure 5 is a side view of the complete connector. Figures 4 and 5 are shown on an enlarged scale.

Figure 6 is a view of the connector of Figure 5 applied to a brush holder.

Figure 7 is an end view of Figure 6.

In the drawing wherein like numbers refer to corresponding parts, 1 is a part sectional and part elevational view of the brush end of a small motor of the universal type, i. e., one that will run on A. C. or D. C. 2 is the commutator of the rotor having brushes 3 and 4 carried by brush holders 5 and 6 that are in turn carried by frame members 7 and 8 through the medium of insulators 9 and 10. The brushes 3 and 4 are held in position by springs 11 and 12 which are positioned by screws 13 and 14, which may be of insulating material so as not to ground the brushes with the frame. Each of the brush holders 5 and 6 are provided with an external groove 15 for the purpose of making an electrical connection between a motor conductor such as one coming from the field or stator of the motor.

In prior art constructions this connection is usually made by an arrangement shown in Figures 2 and 3 wherein a connector 16 is made up by forming a closely wound helical spring into a circle and joining the two ends together and to the bared end of a conductor 17, as by soldering. Then the loop wire 16 is moved over the end of the brush holders 5 and 6 into the groove 15, before the brushes and rotor are slipped into place.

In Figures 4, 5, 6 and 7 I have shown my improved connecting means which comprises a short helix of flat wire 18, the sectional area of which is adequate to carry the starting current of the motor, the material and thickness of which are correctly proportioned to produce satisfactory hoop tension, and permit expansion for assembly on the brush holder without overstressing. The ends of the helix or hoop has its ends 19 and 20 brought out radially from the axial center of the helix. The helix is preferably made of good conducting material and I have found that beryllium copper makes an exceedingly satisfactory connector. The end 20 is adapted to receive a sleeve 21, also preferably made of good conducting material such as beryllium copper. The extremity 22 of the end 20 is preferably bent over at right angles to hold the sleeve in place. The sleeve is also adapted to receive the bared end of a conductor 23 which after being inserted into the sleeve, the latter is crimped or forced into locking engagement with the end 20 of the helix 18.

After the conductor has been assembled to the connector as described, the connector can be readily slipped over the ends of the brush holders 5 and 6 by pressing against the ends 19 and 22 with a thumb and finger, as illustrated in Figure 4, which will open up the helix sufficiently to allow this assembly operation. On releasing the pressure from the ends 19 and 22, the helix or hoop will snap into the groove 15 and secure contact with the brush holder.

Another method of attaching the assembled connector and conductor to a brush holder, when the brush holder is relatively inaccessible, consists in placing the connector on the tip of the finger, with the lead running up the hand, and pressing the connector with a twisting motion, over the end of the brush holder.

While I prefer to have the groove filled as much as possible with the turns of the connector, this is not absolutely necessary.

Also, I have shown in Figure 5 a connector having a rectangular cross section. The form of a cross section through the material forming the hoop may vary somewhat, so long as it is not circular.

Having thus described my invention, what I claim is:

1. Means for making electrical connection to a small motor brush holder having an outer groove therein; said means comprising a helix of from one to one and a half turns of flat wire of good current conductivity and having a dimensional area which will substantially fill the groove in the holder, one end of the helix having a metallic sleeve thereon with said end bent over to hold the sleeve thereon, the sleeve also having a motor conductor inserted therein and then crimped so as to force said conductor and helix end into good electrical contact with each other.

2. Means for making electrical connection to a small motor brush holder having an outer groove therein; said means comprising a helix of from one to one and a half turns of flat wire of good current conductivity the ends of the helix being brought out radially with respect to the axis of the helix, one end acting as a handle for use in manipulating the helix into and out of the holder groove, the other end having a metallic sleeve thereon and held there by an outward bend at the extremity of this end, a motor conductor end also positioned in the sleeve and held in electrical contact with the helix end by the sleeve after crimping.

3. Means for making electrical connection to a small motor brush holder having an outer groove therein; said means comprising a helix of approximately one and a quarter turns with the ends brought out at an angle so pressure applied to these ends will aid in moving the helix into and out of the holder groove, one end having a gripping sleeve thereon for receiving and forcing a motor conductor into good electrical contact with the helix end.

4. Means for making electrical connection to a small motor brush holder having an external circular groove therein; said means comprising a helix of material having a rectangular cross section and 1½ to 1¼ turns, the ends of the helix being brought out radially, one end forming a manipulating handle for assisting in applying the helix to the holder groove while the other end has a sleeve thereon for receiving and forcing a motor conductor into good contact with the associated end which has its extremity bent substantially at right angles to hold the sleeve in place while said conductor is being installed into the sleeve.

5. Means for making electrical connection to a small motor brush holder having an external circular groove therein; said means comprising a hoop of good current conducting material and having a cross section which will retain its resilience in assembly and use, the ends of the hoop being bent outwardly and one of them having a sleeve, adapted to be crimped, held thereon by a right angle terminal bend of one of said ends, and a motor conductor held in the sleeve in good contact with the hoop end after the sleeve is crimped into final position.

6. Means for making electrical connection to a motor brush holder having an external circular groove therein; said means comprising a hoop of sufficient laterally spaced turns of non-circular shaped material having good conducting and resilient qualities the hoop having its ends brought out at an angle so pressure applied to these ends will aid in moving the hoop into and out of the holder groove, one end having a gripping sleeve thereon for receiving and forcing a motor conductor into good electrical contact with the hoop end.

FERNALD S. STICKNEY.

REFERENCES CITED

The following references are of record in the file of this patent:

UNITED STATES PATENTS

| Number | Name | Date |
| --- | --- | --- |
| 910,842 | McIntyre | Jan. 26, 1909 |
| 1,933,628 | Kitto | Nov. 7, 1933 |
| 1,948,268 | Kitto | Feb. 20, 1934 |

FOREIGN PATENTS

| Number | Country | Date |
| --- | --- | --- |
| 503,229 | Great Britain | Apr. 4, 1939 |